(12) United States Patent
Inomori et al.

(10) Patent No.: US 8,317,008 B2
(45) Date of Patent: Nov. 27, 2012

(54) FRICTION CLUTCH, VEHICLE EQUIPPED WITH THE SAME, AND ASSEMBLY METHOD OF FRICTION CLUTCH

(75) Inventors: Toshinori Inomori, Iwata (JP); Yousuke Ishida, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 468 days.

(21) Appl. No.: 12/621,742

(22) Filed: Nov. 19, 2009

(65) Prior Publication Data
US 2010/0126820 A1 May 27, 2010

(30) Foreign Application Priority Data

Nov. 26, 2008 (JP) ................................. 2008-300942
Feb. 6, 2009 (JP) ................................. 2009-025931

(51) Int. Cl.
*F16D 13/71* (2006.01)
*F16D 13/56* (2006.01)
(52) U.S. Cl. .................. 192/70.27; 192/89.22
(58) Field of Classification Search ............... 192/85.5, 192/85.57
See application file for complete search history.

(56) References Cited

U.S. PATENT DOCUMENTS 5,038,904 A * 8/1991 Miller .......................... 192/85.5
5,261,517 A * 11/1993 Hering ....................... 192/70.27
8,166,626 B2 * 5/2012 Sereni et al. ..................... 29/229

FOREIGN PATENT DOCUMENTS

| CH | 259546 A | 1/1949 |
|---|---|---|
| DE | 20 2006 019 190 U1 | 4/2008 |
| EP | 1 696 147 A1 | 8/2006 |
| EP | 1 746 300 A1 | 1/2007 |
| FR | 2 576 073 A3 | 7/1986 |
| JP | 56-10827 A * | 2/1981 |
| JP | 2008-157390 | 10/2008 |

OTHER PUBLICATIONS

Official Communication issued in corresponding European Patent Application No. 09012931, completed on Feb. 10, 2010.
English Translation of Japanese Patent Abstract 2008-157390, Dec. 25 2006, p. 1.

* cited by examiner

*Primary Examiner* — Rodney Bonck
(74) *Attorney, Agent, or Firm* — Keating & Bennett, LLP

(57) ABSTRACT

A clutch 44 has a clutch boss 441, a clutch housing 442, a friction plate 64, a clutch plate 65, and a pressure plate 450. The clutch boss 441 is attached to the main shaft 41 so as to be integrally rotated therewith. The clutch housing 442 encloses the periphery of the clutch boss 441 and is attached to the main shaft 41 so as to be rotated with respect to the main shaft 41. The friction plate 64 has a plate main body and a friction material and rotates together with the clutch housing 442. The clutch plate 65 faces the plate main body via the friction material and rotates together with the clutch boss 441. The pressure plate 450 rotates together with one of the clutch boss 441 the clutch housing 442 which is engaged with the friction plate 64.

16 Claims, 9 Drawing Sheets

FRICTION CLUTCH, VEHICLE EQUIPPED WITH THE SAME, AND ASSEMBLY METHOD OF FRICTION CLUTCH

This application claims priority under 35 U.S.C. §119 to Japanese Patent Application No. 2008-300942 filed on Nov. 26, 2008 and Japanese Patent Application No. 2009-025931 filed on Feb. 6, 2009, the entire disclosures of which applications are both incorporated herein by reference.

BACKGROUND

1. Field of the Invention

The preferred embodiments of the present invention relate, inter alia, to a friction clutch, to a vehicle equipped with the friction clutch, and/or to an assembly method of the friction clutch.

2. Description of Related Art

The following description sets forth the inventor's knowledge of related art and problems therein and should not be construed as an admission of knowledge in the prior art.

Conventionally, a friction clutch has been used for vehicles, such as, e.g., two-wheeled motor vehicles. Japanese Unexamined Laid-open Patent Application Publication No. 2008-157390 (hereinafter referred to as "Patent Document 1") discloses a friction clutch comprising a friction plate engaged with a clutch housing, a clutch plate engaged with a clutch boss, and a pressure plate that presses the friction plate and the clutch plate in a direction in which they come in contact with each other. The friction plate is equipped with a plate main body and a friction material formed on the surface of the plate main body. When the friction plate and the clutch plate contact each other, a frictional force is generated between both of those plates mainly by the aforementioned friction material, which transmits the force between the clutch housing and the clutch boss.

In the aforementioned friction clutch, the friction plate and the clutch plate are placed alternately along the axial direction of the clutch. Among these plural friction plates and clutch plates, the plate arranged most radially outward of the clutch shaft is a friction plate. The pressure plate, by moving in the axial direction of the clutch shaft, presses the outermost friction plate from the outside. The pressure plate is configured to rotate together with the clutch boss.

In this kind of friction clutch, however, in some cases, an oscillatory phenomenon called "judder" can occur in, e.g., the so-called half clutch state.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a friction clutch in which judder is less likely to occur and/or prevented.

Among other potential advantages, some embodiments can provide a vehicle equipped with a friction clutch in which judder is less likely to occur and/or prevented.

Among other potential advantages, some embodiments can provide an assembly method of a friction clutch in which judder is less likely to occur and/or prevented.

According to a first aspect of the present invention, according to some embodiments, a friction clutch is equipped with:

a clutch boss attached to a clutch shaft so as to be integrally rotated therewith;

a clutch housing attached to the clutch shaft in a rotatable manner so as to surround a periphery of the clutch boss;

a friction plate including a plate main body having a surface extending in a direction perpendicular to an axial direction of the clutch shaft and a friction material formed on a surface of the plate main body, the friction plate being engaged with one of the clutch boss and the clutch housing so as to be rotated therewith;

a clutch plate facing the plate main body via the friction material, the clutch plate being engaged with the other of the clutch boss and the clutch housing so as to be rotated therewith; and a pressure plate engaged with one of the clutch boss and the clutch housing with which the friction plate engages so as to be rotated therewith in a manner such that the pressure plate is non-rotatable with respect to the friction plate, the pressure plate being configured to move in the axial direction of the clutch shaft to cause pressure-contact of the friction plate and the clutch plate.

According to a second aspect of the present invention, according to some embodiments, a vehicle is equipped with the aforementioned friction clutch.

According to a third aspect of the present invention, according to some embodiments, an assembly method of a friction clutch comprises:

a step for preparing a clutch boss attached to a clutch shaft so as to be integrally rotated together with the clutch shaft, and a clutch housing enclosing a periphery of the clutch boss and attached to the clutch shaft in a rotatable manner;

a step for arranging a plurality of friction plates equipped with a plate main body having a surface extending in a direction perpendicular to an axial direction of the clutch shaft and a friction material formed on a surface of the plate main body, and a plurality of clutch plates so as to face with each other at intervals in an axial direction of the clutch shaft with the friction plate engaged with the clutch housing and with the clutch plate engaged with the clutch boss;

a step for arranging a pressure plate equipped with a pressure plate main body and an approximately circular disc spring in which an inner peripheral portion of the disc spring is engaged with a side of the pressure plate main body opposite to the friction plate and the clutch plate in a manner such that the pressure plate approaches the friction plate and the clutch plate along the axial direction of the clutch shaft;

a step for deforming the disc spring so that an outer peripheral portion of the disc spring is displaced toward the pressure plate main body side;

a step for fitting an engaging member to an inner peripheral portion of the clutch housing in a state in which the disc spring is deformed; and a step for disposing the disc spring between the clutch housing and the pressure plate main body via the engaging member by restoring the disc spring so that the outer peripheral portion of the disc spring is engaged with the engaging member.

According to the preferred embodiments of the present invention, the occurrence of judder in the friction clutch can be restrained.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Based on extensive study and research, the inventors of the present invention discovered, among other things, the following bases for the occurrence of judder. In particular, a friction plate includes a friction material, and, as such, there is a more likely occurrence of unevenness in thickness along a rotational direction thereof. For example, as shown exaggeratedly in FIGS. 9A and 9B, the board thickness t1 of a portion 101a of the friction plate 101 is sometimes thicker as compared to the board thickness t2 of the other portion 101b. However, when there is such unevenness in board thickness, the spacing between the pressure plate 103 and the friction plate 101 in the axial direction of the clutch may become uneven.

Figures 9A, 9B:
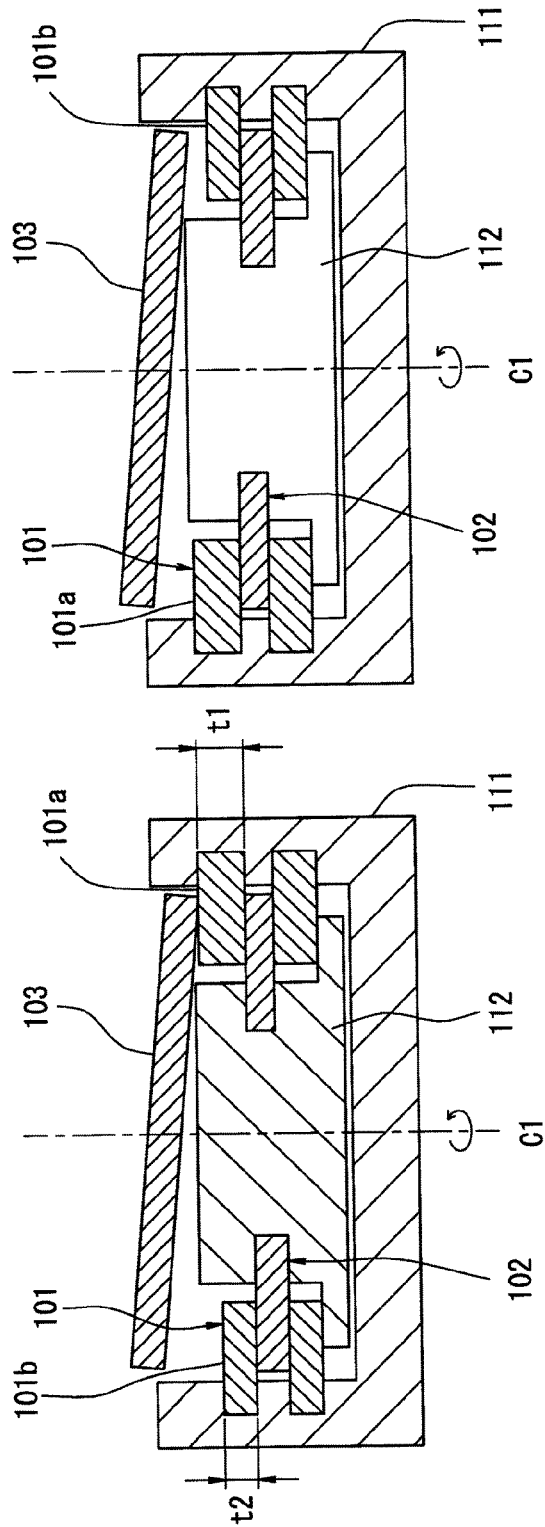
FIG. 9A-9B are schematic cross-sectional views of a conventional friction clutch.

In addition, as shown exaggeratedly in FIGS. 9A and 9B, because of the accumulation of the component tolerance of the entire clutch, generally, the pressure plate contacts the friction plate in an inclined state. Examples of the accumulation of the component tolerance of the entire clutch include the tolerance at the engaging point of the pressure plate and the clutch main body, and the slight difference in the axial center of the clutch rotation shaft and the rotation center of the pressure plate (not shown in the drawing).

Therefore, at the time of engaging the clutch, when the pressure plate 103 not relatively rotating with respect to the clutch housing 111 approaches the friction plate 101 rotating together with the clutch housing 111, a state in which the pressure plate 103 is in contact with the friction plate 101 (a state shown in FIG. 9A) and a state in which the pressure plate 103 is not in contact with the friction plate 101 (a state shown in FIG. 9B) are repeated alternately. As a result, these repetition of the contact state and non-contact state causes vibrations, resulting in the so-called judders. In addition, in FIGS. 9A and 9B, the reference numeral "112" denotes a clutch boss, and the reference numeral "102" denotes a clutch plate. "C1" denotes an axial direction of a clutch shaft.

The inventors of the present invention have determined, among other things, that the repetition of the contact state and the non-contact state is caused by the relative rotation of the pressure plate 103 with respect to the friction plate 101, and determined that the fact that the repetition of the contact state and the non-contact state can be avoided by, e.g., employing a structure in which the pressure plate 103 does not relatively rotate with respect to the friction plate 101, which in turn can control the occurrence of judder. Hereinafter, embodiments of the present invention will be explained.

Embodiment 1

Figure 1:
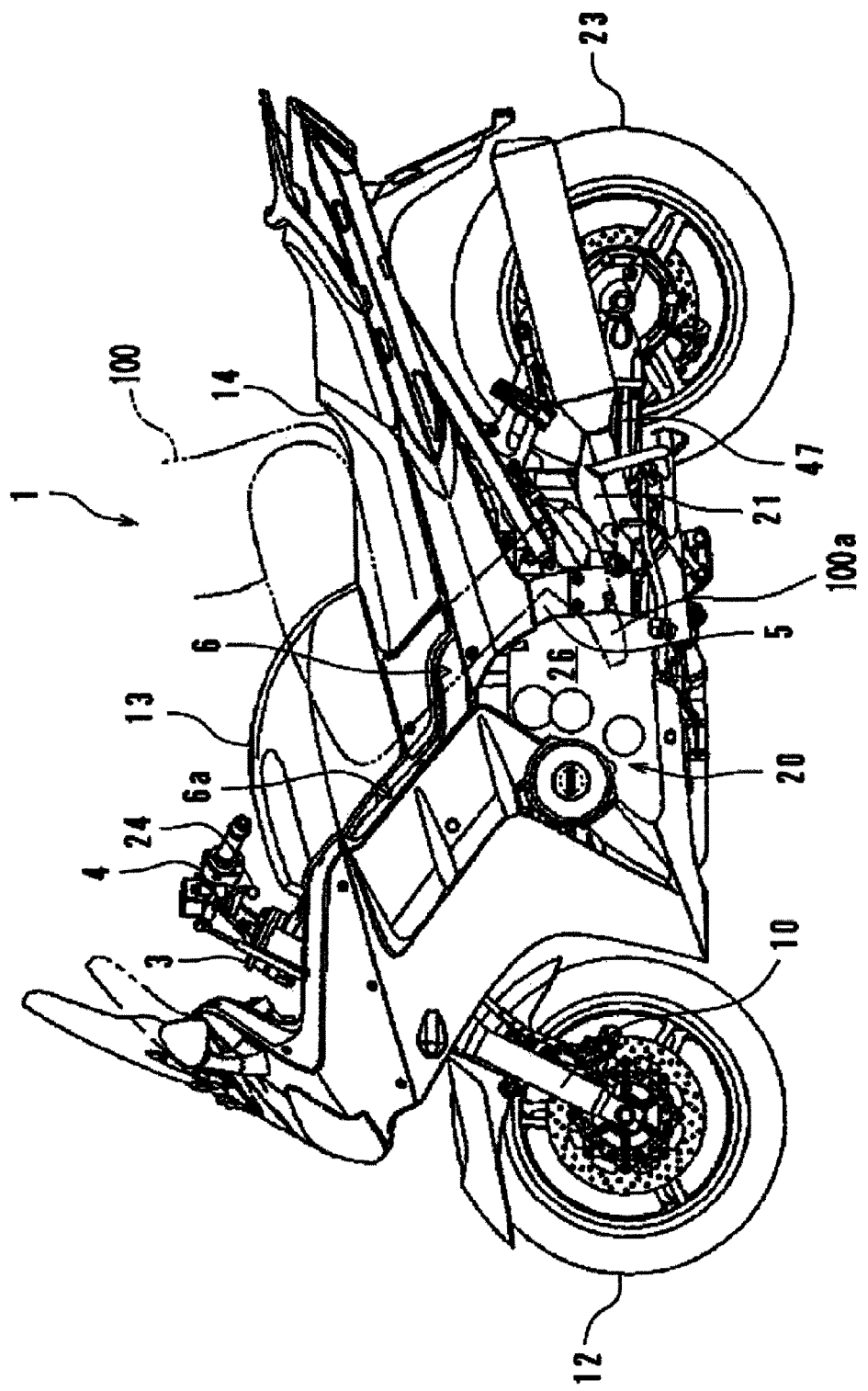
FIG. 1 is a side view of a two-wheeled motor vehicle according to the present invention.

FIG. 1 is a side view of a motorcycle 1. The motorcycle 1 is an example of a vehicle according to this embodiment. The motorcycle 1 can involve any type of motorcycle, such as, e.g., a scooter, a moped, a motocrosser, a dirt bike, and an motorized vehicle, including vehicles with more and/or wheels than a common two wheeled vehicle, or the like. In some embodiments, such a vehicle can be a vehicle in which a rider 100 straddles (e.g., with legs proximate left and right sides of the vehicle in use), can be a snow mobile or an ATV (All Terrain Vehicle), and/or can be any other vehicle, such as, e.g., having two-wheels, three wheels, four wheels, and/or any other number of wheels.

As shown in FIG. 1, the motorcycle 1 is provided with a head pipe 3, a vehicle body frame 6, a steering handle 4, a seat 14, a front wheel 12, and a rear wheel 23 which is a driving wheel. The front wheel 12 is disposed on the front side of the motorcycle 1, and the rear wheel 23 is disposed on the rear side of the motorcycle 1. The vehicle body frame 6 has two frame portions 6a extending rearwardly to the right and left from the head pipe 3. In FIG. 1, only one frame portion 6a is shown. The rear portion of the frame portion 6a extends downwardly and is connected to the rear arm bracket 5. The front end portion of a rear arm 21 is supported by the rear arm bracket 5 in an up-and-down swingable manner. The rear wheel 23 is supported by the rear end portion of the rear arm 21.

A front fork 10 is pivotably supported by the head pipe 3. The steering handle 4 is attached to the upper end of the front fork 10, and the front wheel 12 is rotatably attached to the lower end of the front fork 10. A fuel tank 13 is disposed on the upper portion of the frame portion 6a, and a seat 14 is disposed on the rear side of the fuel tank 13.

A power unit 20 is suspended by the frame portion 6a and the rear arm bracket 5. The power unit 20 at least includes an engine 45, a clutch 44, and a transmission 43 (see FIG. 2). The engine 45, the clutch 44, and the transmission 43 are integrally built into a crank case 26.

Figure 2:
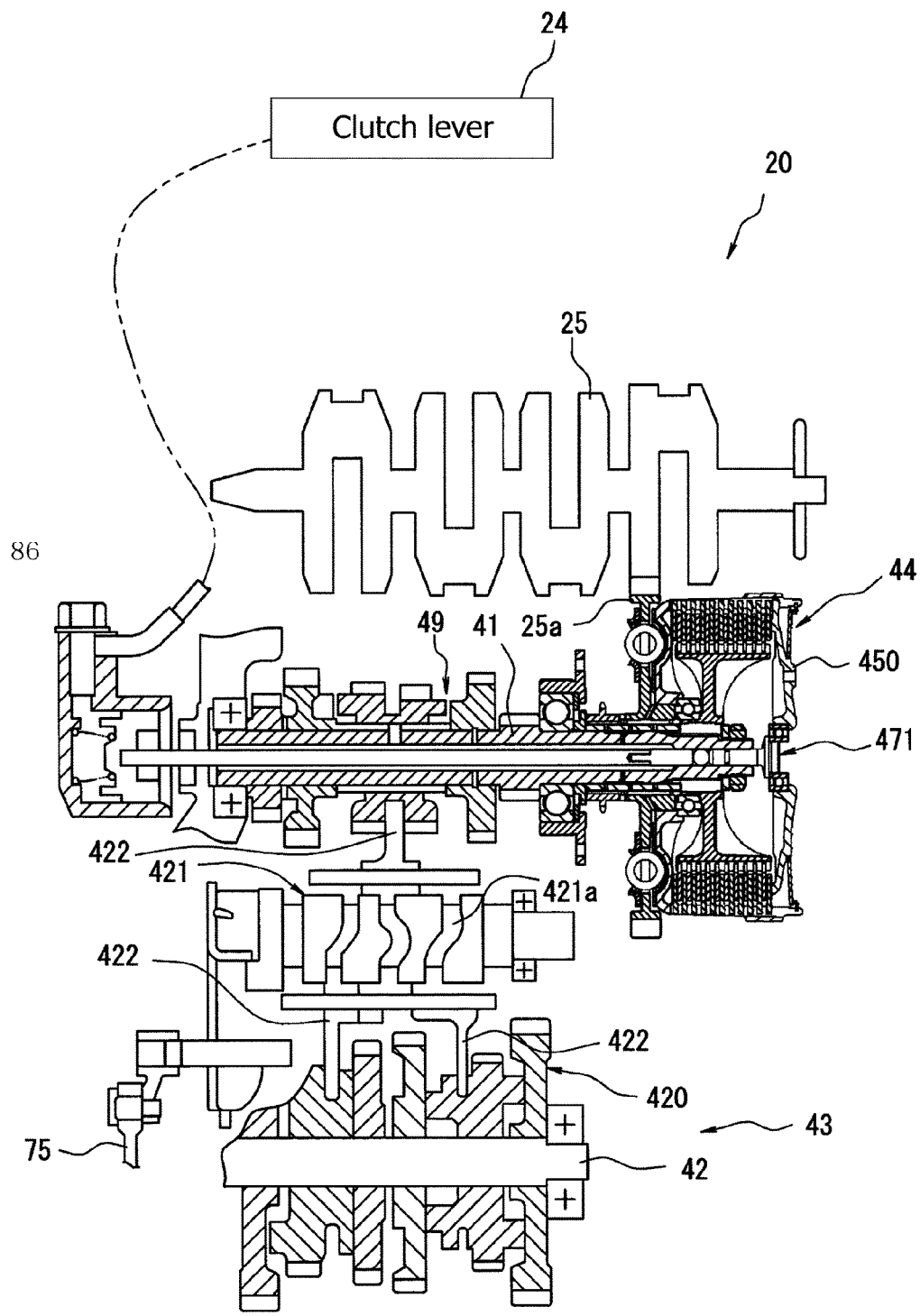
FIG. 2 is an internal structural view of a power unit according to the present invention.

FIG. 2 is a cross-sectional view showing the inner structure of the power unit 20. A main shaft 41 is arranged parallel to a crank shaft 25. A drive shaft 42 is arranged parallel to the main shaft 41. The rotation of the crank shaft 25 is transmitted to the main shaft 41 based on the engagement/disengagement of the clutch 44. The rotation of the main shaft 41 is transmitted to the drive shaft 42 via the transmission 43.

The transmission 43 includes a shift cam 421. A plurality of cam grooves 421a are formed on the outer circumferential surface of the shift cam 421. Each shift fork 422 is engaged with each cam groove 421a. Each shift fork 422 is engaged with a predetermined gear of the main shaft 41 and the drive shaft 42. The rotation of the shift cam 421 causes a movement of each of the plurality of shift forks 422 in the axial direction of the main shaft 41 by the guide of the cam grooves 421a. Therefore, the gear position of the transmission 43 is changed. As a result, between the main shaft 41 and the drive shaft 42, the rotation is transmitted at a predetermined transmission gear ratio through the transmission gear 49 and the transmission gear 420.

The shift cam 421 rotates by only a predetermined angle by the reciprocating movements of the shift rod 75. The reciprocating movements of the shift rod 75 are made by operations of the left foot 100a of the rider 100. However, the reciprocating movements of the shift rod 75 are not limited to be made with operations by the left foot 100a of the rider 100. The power unit 20 can include a shift actuator or the like, not shown in the drawing. In this case, the shift rod 75 can make reciprocating movements by the drive of the shift actuator.

In cases where the clutch 44 is in an engaged state when activating the engine 45, the torque of the engine 45 is transmitted to the main shaft 41 via the clutch 44. Also, between the main shaft 41 and the drive shaft 42, the rotation is transmitted at a predetermined transmission gear ratio, which rotates the drive shaft 42. When the drive shaft 42 rotates, the torque is transmitted by a power transmission mechanism 47 connecting the drive shaft 42 and the rear wheel 23 (see FIG. 1), which rotates the rear wheel 23. However, the transmission 43 according to this embodiment is not limited to a multi-stepped transmission, but can be a continuously variable transmission having a belt.

Figure 3:
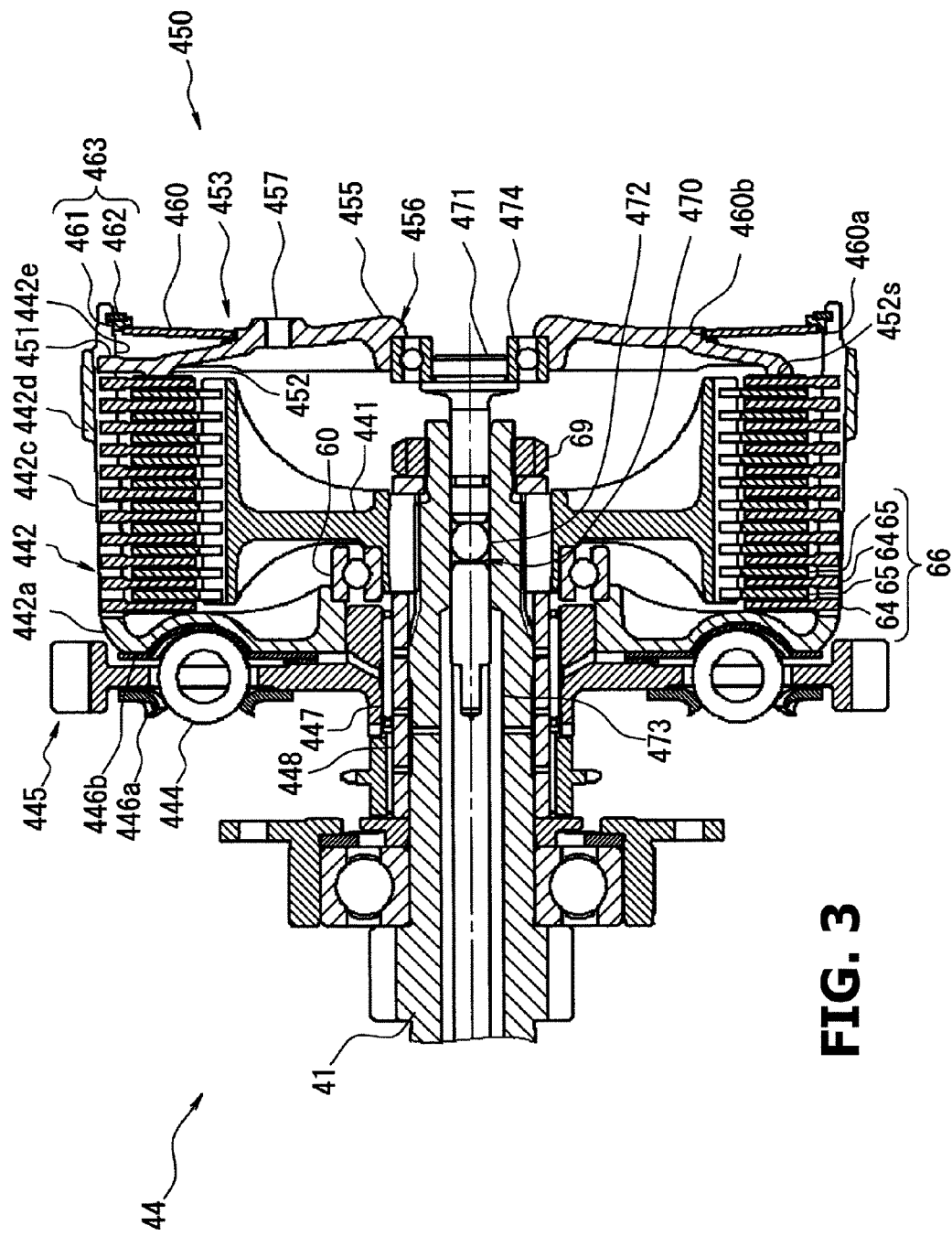
FIG. 3 is a cross-sectional view of a clutch according to Embodiment 1.

Structure of the Clutch:

According to this embodiment, the clutch 44 is a wet-type multi-plate friction clutch. However, the clutch 44 can be a dry friction clutch or a single-plate friction clutch. In this embodiment, the clutch 44 is engaged/disengaged by the operation of a clutch lever 24 by the rider 100. As shown in FIG. 3, the clutch 44 is equipped with a clutch boss 441, a clutch housing 442, and a pressure plate 450.

a. Clutch Housing 442

The clutch housing 442 encloses the periphery of the clutch boss 441 and is rotatably attached to the main shaft 41. The main shaft 41 penetrates through the clutch housing 442. The clutch housing 442 includes a housing main body 442c. The housing main body 442c is formed in an approximately cylindrical shape with one end closed by a bottom portion 442a. The main shaft 41 penetrates through the bottom portion 442a of the housing main body 442c. A plurality of arms 442d are formed on the housing main body 442c. Each arm 442d extends outward of the vehicle width direction from the bottom portion 442a.

As shown in FIG. 3, the vehicle width direction means a right-and-left direction. In this embodiment, the clutch 44 is disposed on the right side of the main shaft 41, and therefore, the outer side of the vehicle width direction is a right side and the inner side of the vehicle width direction is a left side. Consequently, hereinafter, the outer side and the inner side of the vehicle width direction will be simply referred to as a right side and a left side, respectively.

b. Scissors Gear 445

A scissors gear 445 is attached to the clutch housing 442. The scissors gear 445 is equipped with a spring 444 and two plates 446a and 446b. The two plates 446a and 446b are fixed mutually by fixtures, such as, e.g., rivets and screws, so as not to move in the axial direction of the main shaft 41.

The scissors gear 445 is engaged with a gear 25a of the crank shaft 25 (see FIG. 2). Also, a portion of the scissors gear 445 is fixed to the bottom portion 442a of the clutch housing 442 in a relatively immovable manner. With this structure, the rotation of the crank shaft 25 causes integral rotation of the portion of the scissors gear 445 and the clutch housing 442.

A needle bearing 447 is disposed between the scissors gear 445 and the main shaft 41. Between the scissors gear 445 and the main shaft 41, a spacer 448 non-rotatably fixed to the main shaft 41 is disposed. By the needle bearing 447, the scissors gear 445 is rotatable with respect to the main shaft 41. In other words, it is configured such that the rotation of the scissors gear 445 is not directly transmitted to the main shaft 41.

c. Clutch Boss 441

The clutch boss 441 is attached to the main shaft 41 in an integrally rotatable manner. The clutch boss 441 is fixed to the main shaft 41 with a nut 69 in a manner such that it cannot be rotated with respect to the main shaft 41. That is, the clutch boss 441 rotates together with the main shaft 41.

d. Thrust Bearing 60

Furthermore, the clutch 44 is equipped with a thrust bearing 60. The thrust bearing 60 is arranged between the clutch housing 442 and the clutch boss 441. The thrust bearing 60 prevents the relative movements of the clutch housing 442 and the clutch boss 441 in the axial direction of the main shaft 41 while allowing the relative rotation of the clutch housing 442 and the clutch boss 441.

Specifically, the thrust bearing 60 is arranged between the clutch boss 441 and the scissors gear 445 with respect to the axial direction of the main shaft 41. Consequently, the scissors gear 445, the needle bearing 447 and spacer 448, and the clutch boss 441 are controlled by the thrust bearing 60 so as not to get closer than a predetermined distance. That is, the scissors gear 445, the needle bearing 447 and the spacer 448 are controlled in their movements toward the clutch boss 441 side with respect to the axial direction of the main shaft 41.

The thrust bearing 60 is disposed between the clutch boss 441 and the clutch housing 442 with respect to the radial direction of the main shaft 41. The outer circumferential side of the thrust bearing 60 is attached to the clutch housing 442 and the inner circumferential side thereof is attached to the clutch boss 441 with respect to the radial direction of the main shaft 41. Consequently, the relative movements of the clutch boss 441 and the clutch housing 442 in the axial direction of the main shaft 41 is prevented, and they can relatively rotate around the center of the main shaft 41.

e. Friction Plate 64

A plurality of friction plates 64 are arranged on the inner side of the clutch housing 442. The plurality of friction plates 64 are engaged with the clutch housing 442 so as to be rotated therewith. In this embodiment, each friction plate 64 is fixed to the clutch housing 442 with respect to the rotary direction of the main shaft 41. Consequently, the plurality of friction plates 64 rotate together with the clutch housing 442. In addition, each friction plate is displaceable in the axial direction of the main shaft 41. Therefore, the distance between the adjacent friction plates 64 are changeable.

Figure 4:
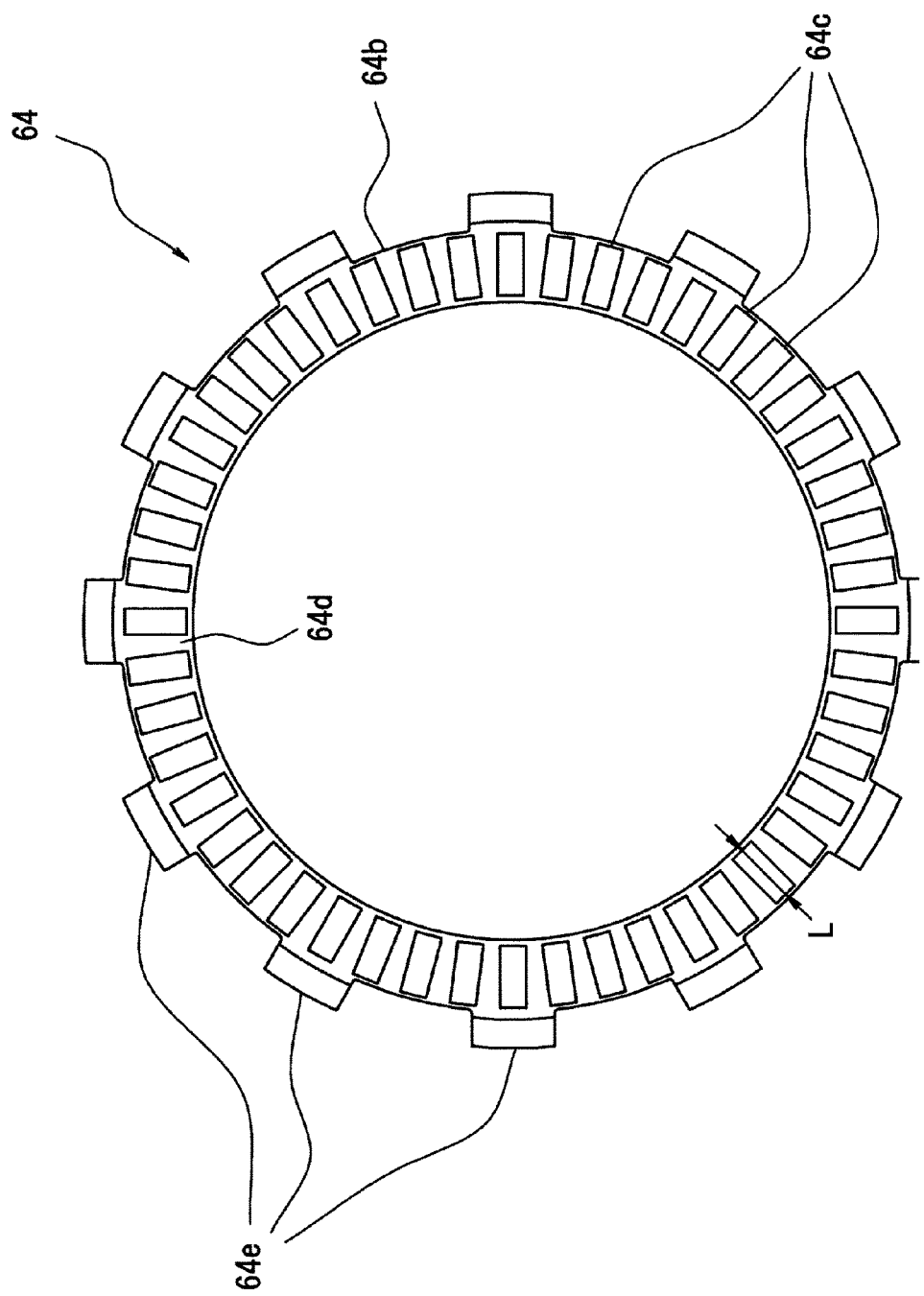
FIG. 4 is a front view of a friction plate according to Embodiment 1.

As shown in FIG. 4, the friction plate 64 according to this embodiment is approximately annular in shape. Each friction plate 64 has a plate main body 64b and friction materials 64c. The plate main body 64b has a surface 64d. The surface 64d extends in a direction perpendicular to the axial direction of the main shaft 41 (see FIG. 3). Also, the friction materials 64c are formed on the surface 64d of the plate main body 64b. The back side of FIG. 4 is not shown, but the friction materials 64c are also provided on the surface 64d of the back side of FIG. 4. The friction materials 64c are fixed to the surface 64d.

Each friction plate 64 has a plurality of claw portions 64e. Each claw portion 64e extends in the radially outward direction. In the meantime, the clutch housing 442 has a plurality of grooves not shown in the drawing. The plurality of grooves are formed on an arm 442d of the clutch housing 442. The number of the plurality of grooves and that of the claw portions 64e of the friction plate 64 are the same. Each of the claw portions 64e are engaged with each of the plurality of grooves. Consequently, each friction plate 64 is engaged with the clutch housing 442. Therefore, as mentioned above, each friction plate 64 is fixed to the clutch housing 442 so as not to move in the rotational direction of the main shaft 41.

f. Clutch Plate 65

As shown in FIG. 3, the plurality of friction plates 64 are arranged in the axial direction of the main shaft 41. A clutch plate 65 is disposed between the adjacent friction plates 64. The clutch plate 65 is approximately annular in shape. The clutch plate 65 faces the adjacent friction plate 64. The clutch plate 65 faces the plate main body 64b of the friction plate 64 via the friction material 64c. Also, in this embodiment, the clutch plate 65 is engaged with the clutch boss 441 so as to be rotated therewith. Each clutch plate 65 is fixed to the clutch boss 441 with respect to the rotational direction of the main shaft 41. Therefore, the plurality of clutch plates 65 rotate together with the clutch boss 441. In addition, each clutch plate 65 can be displaceable in the axial direction of the main shaft 41. Consequently, the distance between the adjacent clutch plates 65 is changeable.

In this embodiment, a plate group 66 is constituted by the plurality of friction plates 64 and the plurality of clutch plates 65.

g. Pressure Plate 450

A pressure plate 450 is disposed on the right side of the main shaft 41. The pressure plate 450 is formed into an approximately disc shape. The pressure plate 450 has a pressure plate main body 455 engaged with the clutch housing 442. Also, the pressure plate 450 has a disc spring 460. The pressure plate 450 is engaged with the clutch housing 442 so as to be rotated therewith in such a manner that the pressure plate 450 cannot rotate relative to the friction plate 64. As mentioned above, in this embodiment, the friction plate 64 is engaged with the clutch housing 442 so as to be rotated therewith. The pressure plate 450 is configured to move in the axial direction of the main shaft 41 to thereby cause pressure-contact of the friction plate 64 and the clutch plate 65.

The pressure plate main body 455 according to this embodiment is engaged with the arm 442d of the clutch housing 442. Specifically, in the pressure plate main body 455, the radially outward end portion 451 is fitted to the inner circumferential side of the arm 442d of the clutch housing 442. Therefore, the pressure plate 450 is non-rotatable with respect to the clutch housing 442, and rotates together with the clutch housing 442.

In this embodiment, the pressure plate 450 is disposed so as to face the friction plate 64 in the axial direction of main shaft 41. That is, in the plate group 66 of this embodiment, the friction plate 64 is arranged on the rightmost side. The pressure plate 450 can attain the pressure-contact of the friction plate 64 and the clutch plate 65 by pressing the friction plate 64.

A pressing portion 452 protruding toward the plate group 66 side is formed on the radially outward portion of the pressure plate main body 455. The pressing portion 452 is formed radially inward of the outer end portion 451. The pressing portion 452 faces the friction plate 64 positioned at the rightmost side of the plate group 66. When the pressure plate 450 moves to the left, the pressing portion 452 presses the friction plate 64 to the left. As a result, the friction plates 64 and the clutch plates 65 forming the plate group 66 will be in a pressure-contacted state.

In addition, the contact area of the pressing portion 452 is smaller than the contact area of the friction plate 64 and the clutch plate 65. The pressing portion 452 has a contact surface 452s which comes into contact with the friction plate 64. As shown in FIGS. 3 and 4, the size of the contact surface 452s along the radial direction is smaller than the size L of the contact portion in which the friction plate 64 and the clutch plate 65 contact each other in the radial direction. The contact area of the friction plate 64 with respect to the clutch plate 65 is proportional to the size L of the contact portion in which the friction plate 64 and the clutch plate 65 contact each other in the radial direction.

h. Disk Spring 460

The disc spring 460 is placed between the clutch housing 442 and the pressure plate main body 455. The disc spring 460 urges the pressure plate main body 455 in the direction in which the pressure plate main body 455 is pressure-contacted to the friction plate 64 and the clutch plate 65. The disc spring 460 is approximately cylindrical in shape.

On the other hand, a retainer portion 453 supporting the disc spring 460 is formed on the side of the pressure plate main body 455 opposite to the plate group 66 side. The retainer portion 453 is formed radially inner than the pressing portion 452. Also, an elastic retainer 461 is attached to the arm 442d of the clutch housing 442. The elastic retainer 461 is placed more rightward than the position in which the outer end portion 451 of the pressure plate 450 is engaged. The elastic retainer 461 is fitted to the inner circumferential portion 442e of the housing main body 442c. The inner circumferential portion 442e is formed on the inner circumferential side of the arm 442d.

On the arm 442d, a circlip 462 is formed more rightward than the position in which the elastic retainer 461 is provided. The circlip 462 is fixed to the arm 442d relative to the axial direction. The circlip 462 is fitted to the inner circumferential portion 442e of the clutch housing 442. In this embodiment, the elastic retainer 461 and the circlip 462 form an engaging member 463 for the disc spring 460.

The disc spring 460 is disposed in such a way that it extends in a direction perpendicular to the axial direction of the main shaft 41. The outer circumferential portion 460a (in other words, the radially outer portion) is engaged with the elastic retainer 461, and the inner circumferential portion 460b (in other words, the radially inner portion) is engaged with the retainer portion 453. The right side of the elastic retainer 461 is directly in contact with the circlip 462. Therefore, the elastic retainer 461 and the pressure plate main body 455 are controlled to move to the opposite side (that is, to the right side) of the plate group 66. Consequently, the disc spring 460 can urge the pressure plate main body 455 toward the plate group 66 side (that is, to the left). As a result, the pressure plate main body 455 is engaged with the clutch housing 442 via the disc spring 460. Therefore, the pressure plate main body 455 can rotate together with the clutch housing 442 even if its outer end portion 451 is not fitted to the inner circumferential portion 442e, i.e., not directly engaged with the clutch housing 442.

Also, as shown in FIG. 1, the steering handle 4 is provided with a clutch lever 24. The rider 100 can engage/disengage the clutch 44 by operating the clutch lever 24. That is, when the clutch lever 24 is operated by the rider 100, the pressure plate main body 455 moves to the opposite side of the plate group 66 (that is, to the right side), against the urging force of the disc spring 460.

As shown in FIG. 2, the clutch 44 is provided with a clutch release mechanism 86. The clutch release mechanism 86, when the rider 100 of the motorcycle 1 (see FIG. 1) operates the clutch lever 24, forcibly releases the pressure-contacted state of the plate group 66. That is, the manual operations of the rider 100 of the motorcycle 1 operate the clutch release mechanism 86 to disengage the clutch 44.

A portion of the clutch release mechanism 86 according to this embodiment is accommodated in the main shaft 41. The operation of the clutch release mechanism 86 is transmitted to the pressure plate main body 455 through the inside portion of the main shaft 41. When the clutch release mechanism 86 is activated, a push mechanism 470 moves to the right side against the urging force of the disc spring 460. The push mechanism 470 includes a short push rod 471, a ball 472, and a long push rod 473. The ball 472 is placed between the short push rod 471 and the long push rod 473. The main shaft 41 can rotate in the shaft circumferential direction, but the short push rod 471 and the long push rod 473 do not rotate together with the main shaft 41.

The main shaft 41 has a pipe shape. The left side end portion of the short push rod 471 is housed inside the main shaft 41. On the other hand, the right side end portion of the short push rod 471 protrudes from the right edge of the main shaft 41.

The short push rod 471 and the pressure plate main body 455 are mutually fixed through a bearing 474. The bearing 474 is attached to the right end portion of the short push rod 471 and a center portion 456 of the pressure plate main body 455. Both the short push rod 471 and the pressure plate main body 455 can move in the axial direction of the main shaft 41. However, the short push rod 471 and the pressure plate main body 455 rotate relatively in the circumferential direction of the main shaft 41.

When the clutch release mechanism 86 is activated, the long push rod 473 moves to the right against the urging force of the disc spring 460. At this time, the long push rod 473 pushes the short push rod 471 to the right via the ball 472. Consequently, the short push rod 471 and the pressure plate main body 455 move to the right against the urging force of the disc spring 460. When the pressure plate main body 455 moves to the right, the pressure-contact of the friction plate 64 and the clutch plate 65 is released, and the clutch will be disengaged.

The operation of the clutch release mechanism 86 is not limited to the operation in which the operation of the clutch release mechanism is transmitted to the pressure plate main body 455 through the inside of the main shaft 41. Another mechanism for moving the short push rod 471 to the right can be provided on the clutch 41. At least a portion of the aforementioned structure is formed on the right side of the short push rod 471. In this case, the right end portion of the short push rod 471 is mechanically connected to the clutch lever 24 through the aforementioned mechanism. When the clutch lever 24 is operated by a rider 100 (see FIG. 1), the short push rod 471 is pulled to the right by the aforementioned mechanism against the urging force of the disc spring 460. Consequently, the short push rod 471 moves to the right to cause disengagement of the clutch.

Also, the clutch release mechanism 86 is not limited to be activated by the operations of the clutch lever 24. The clutch release mechanism 86 can be activated by, for example, activating the clutch actuator or the like (not shown). In this case, the clutch actuator can be automatically activated regardless whether or not the rider has performed any operation. The activation of the clutch actuator activates the clutch release mechanism 86 to cause the rightward movement of the short push rod 471 against the urging force of the disc spring 460. Consequently, the clutch 44 will be disengaged. Also, in cases where another mechanism for moving the short push rod 471 to the right is provided on the clutch 44, it can be configured such that the aforementioned mechanism can be activated by activating the clutch actuator.

Figure 5:
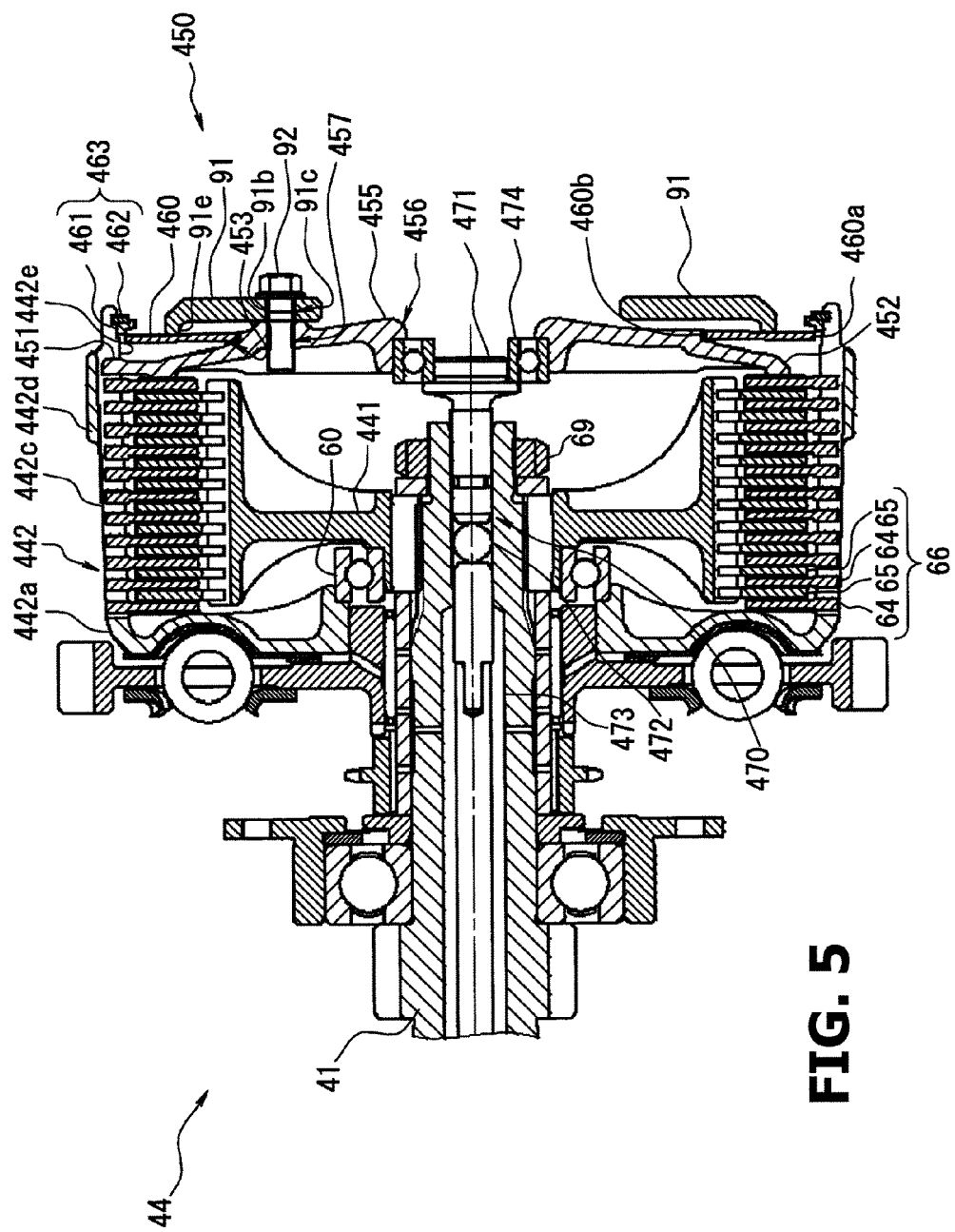
FIG. 5 is a cross-sectional view showing an example of an assembly method of the clutch according to Embodiment 1.
Figure 6:
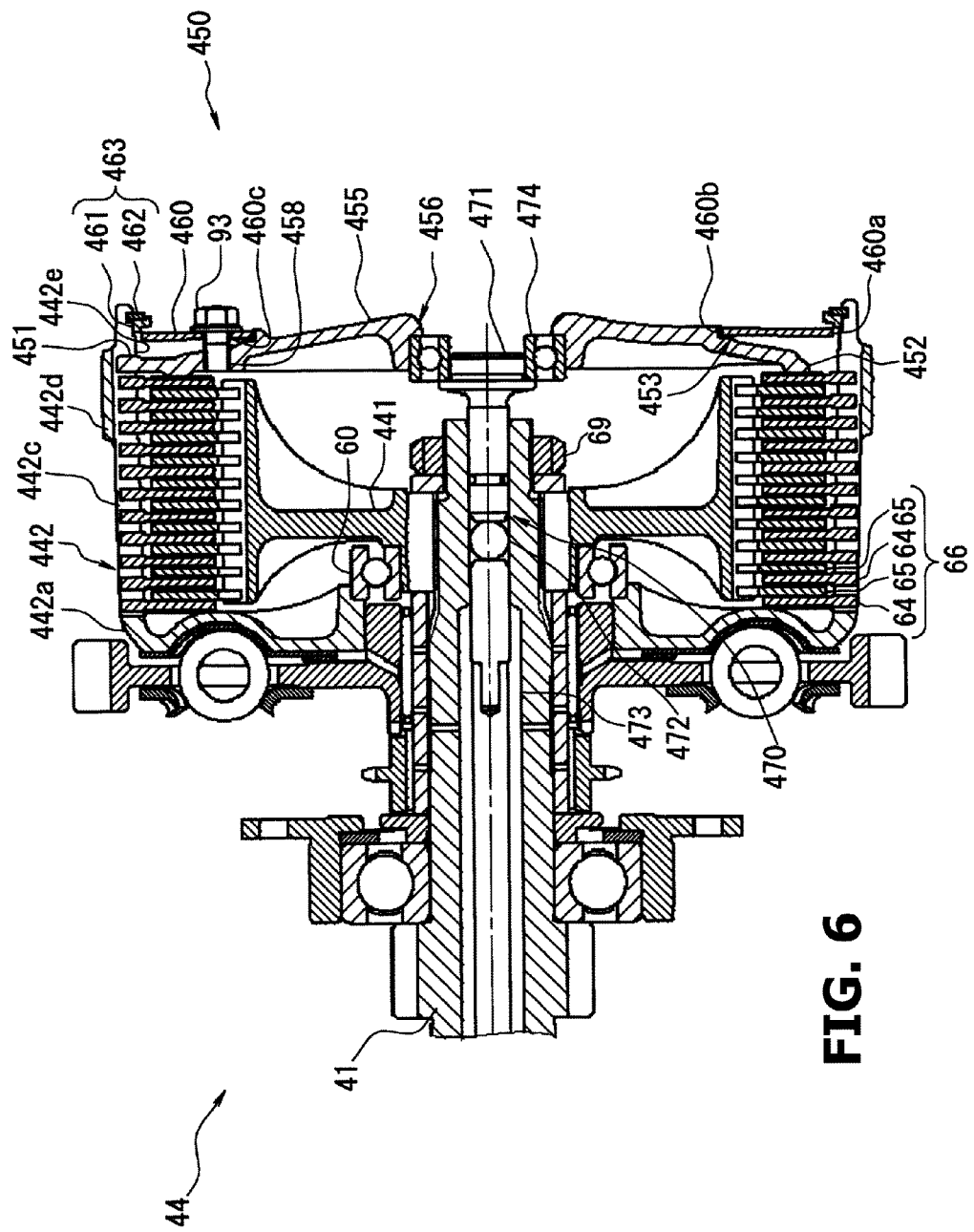
FIG. 6 is a cross-sectional view showing another example of an assembly method of the clutch according to Embodiment 1.

As shown in FIG. 5, a jig mounting portion 457 for mounting a jig 91 is formed in the pressure plate main body 455. Alternatively, a fastener mounting portion 458 for mounting a fastener 93 can be formed in the pressure plate main body 455 as shown in FIG. 6. The jig 91 and the fastener 93 are attached to the fig mounting portion 457 before the circlip 462 is fitted to the inner circumferential portion 442e of the clutch housing 442, and deform the disc spring 460 so that the outer circumferential portion 460a of the disc spring 460 is displaced toward the pressure plate main body 455 side.

i. Jig Mounting Portion 457

FIG. 5 shows an example in which the disc spring 460 is attached to the inner circumferential portion 442e of the clutch housing 442. As shown in FIG. 5, a jig mounting portion 457 is formed in the pressure plate main body 455 as an aperture extending in the axial direction of the main shaft 41. That is, the jig mounting portion 457 is an aperture formed in the pressure plate main body 455 and extending in the axial direction of the main shaft 41. The jig mounting portion 457 is formed at a portion outer than the center portion 456 but inner than the retainer portion 453 with respect to the radial direction of the pressure plate main body 455. Also, a thread is formed on the inside of the jig mounting portion 457.

The jig 91 to be attached to the pressure plate main body 455 is approximately annular in shape. Also, the jig 91 has a claw portion 91e on the radially outward circumferential portion thereof. The claw portion 91e is a portion extending in the axial direction of the main shaft 41 than other portions, and extends toward the left side of FIG. 5. An aperture 91c extending in the axial direction of the main shaft 41 is formed in the jig 91. The aperture 91c is formed in the portion located radially inward of the claw portion 91e. A fastener 92 penetrates through the aperture 91c and the jig mounting portion 457.

When the fastener 92 is screwed into and engaged with the jig mounting portion 457, the claw portion 91e directly comes into contact with the disc spring 460, and the outer circumferential portion 460a of the disc spring 460 is displaced toward the pressure plate main body 455 side in response to the amount of intrusion of the fastener 92 into the pressure plate main body 455. At this time, the inner circumferential portion 460b of the disc spring 460 is engaged with the retainer portion 453 and therefore it will not be displaced toward the pressure plate main body 455 side. In other words, when the fastener 92 is inserted into the aperture 91c and screwed into and engaged with the jig mounting portion 457, the outer circumferential portion 460a of the disc spring 460 bends toward the pressure plate main body 455 side, causing elastic deformation of the disc spring 460. Consequently, the pressing portion 452 of the pressure plate main body 455 causes pressure-contact of the friction plate 64 and the clutch plate 65.

When the outer circumferential portion 460a of the disc spring 460 bends toward the pressure plate main body 455 side and the disc spring 460 elastically deforms, the elastic retainer 461 and the circlip 462 are fitted to the inner circumferential side of the arm 442d. When the elastic retainer 461 and the circlip 462 are fitted to the inner circumferential side of the arm 442d, the fastener 92 is removed from the jig mounting portion 457 and the jig 91 is removed from the pressure plate main body 455. In this way, the disc spring 460 extends in a direction perpendicular to the axial direction of the main shaft 41, the outer circumferential portion 460a thereof engages with the elastic retainer 461, and the inner circumferential portion 460b thereof engages with the retainer portion 453 (see FIG. 3). Now, the number of jig mounting portion 457 of the pressure plate main body 455 is not especially limited. In FIG. 5, only one jig mounting portion 457 is shown. The fastener 92 according to this embodiment is a generally available bolt.

j. Fastener Mounting Portion 458

FIG. 6 shows another example in which the disc spring 460 is attached to the inner circumferential portion 442e of the clutch housing 442. As shown in FIG. 6, a fastener mounting portion 458 is formed in the pressure plate main body 455 as an aperture extending in the axial direction of the main shaft 41. That is, the fastener mounting portion 458 is an aperture of the pressure plate main body 455 extending in the axial direction of the main shaft 41. The fastener mounting portion 458 is formed radially outward of the retainer portion 453 but radially inward of the outer edge portion 451. Also, a thread is formed on the inside of the fastener mounting portion 458.

Also, as shown in FIG. 6, an aperture 460c extending in the axial direction of the main shaft 41 is formed in the disc spring 460. The position of the aperture 460c and that of the fastener mounting portion 458 are approximately the same with respect to the radial direction of the clutch housing 442. The fastener 93 penetrates through the aperture 460c. Also, the fastener 93 is screwed into the fastener mounting portion 458. The fastener 93 according to this embodiment is a generally available bolt.

When the fastener 93 is screwed into the aperture 460c and the fastener mounting portion 458, the bearing surface of the fastener 93 directly comes into contact with the disc spring 460, which causes displacement of the outer circumferential portion 460a of the disc spring 460 toward the pressure plate main body 455 side in accordance with the intrusion amount of the fastener 93 into the pressure plate main body 455. At this time, the inner circumferential portion 460b of the disc spring 460 is engaged with the retainer portion 453 and therefore will not be displaced toward the pressure plate main body 455 side. That is, when the fastener 92 penetrates the aperture 460c and is screwed into the fastener mounting portion 458, the outer circumferential portion 460a of the disc spring 460 bends toward the pressure plate main body 455, causing elastic deformation of the disc spring 460. At this time, the pressing portion 452 of the pressure plate main body 455 causes pressure-contact of the friction plate 64 and the clutch plate 65.

When the outer circumferential portion 460a of the disc spring 460 bends toward the pressure plate main body 455 side and the disc spring 460 elastically deforms, the elastic retainer 461 and the circlip 462 are fitted to the inner circumferential side of the arm 442d. When the elastic retainer 461 and the circlip 462 are fitted to the inner circumferential side of the arm 442d, the fastener 93 is removed from the fastener mounting portion 458 and the aperture 460c. In this way, the disc spring 460 extends in a direction perpendicular to the axial direction of the main shaft 41, its outer circumferential portion 460a engages with the elastic retainer 461, and the inner circumferential portion 460b engages with the retainer portion 453. The number of the fastener mounting portion 458 of the pressure plate main body 455 is not especially limited. In FIG. 6, only one fastener mounting portion 458 is shown.

Hereinafter, based on the examples shown in FIGS. 5 and 6, the assembly method of the clutch 44 will be explained.

First, the clutch boss 441 is attached to the main shaft 41 in such a way that it integrally rotates together with the main shaft 41, and the clutch housing 442 is rotatably attached to the main shaft 41 so as to enclose the periphery of the clutch 441. This procedure is referred to as Step 1.

Next, the plate group 66 is housed inside the clutch housing 442. In detail, a plurality of friction plates 64 and a plurality of clutch plates 65 are alternately disposed so as to face each other with a space in the axial direction of the main shaft 41. At this time, the plurality of friction plates 64 are engage with the clutch housing 442, and the plurality of clutch plates 65 are engaged with the clutch boss 441. Consequently, the friction material 64c formed on the friction plate 64 faces the clutch plate 65. This procedure is referred to as Step 2.

After housing the plate group 66 inside the clutch housing 442, the pressure plate 450 is disposed in such a way that it approaches the plate group 66 along the axial direction of the main shaft 41. In this embodiment, the pressure plate 450 is comprised of the pressure plate main body 455 and the disc spring 460. The outer end portion 451 of the pressure plate main body 455 engages with the arm 442d. The inner circumferential portion 460b of the disc spring 460 is engaged with the retainer portion 453. The outer end portion 451 of the pressure plate main body 455 engages with the arm 442d at the portion outward of the rightmost friction plate 64. This procedure is referred to as Step 3.

Next, the disc spring 460 is deformed in such a way that the outer circumferential portion 460a of the disc spring 460 is deformed toward the pressure plate main body 455 side. In cases where a jig mounting portion 457 is formed in the pressure plate main body 455 (that is, in the case of the clutch 44 shown in FIG. 5), the outer circumferential portion 460a of the disc spring 460 is deformed toward the pressure plate main body 455 side in accordance with the intrusion amount of the fastener 92 to the pressure plate main body 455. On the other hand, in cases where the fastener mounting portion 458 is formed in the pressure plate main body 455 (that is, in the case of the clutch 44 shown in FIG. 6), the outer circumferential portion 460a of the disc spring 460 is deformed toward the pressure plate main body 455 side in accordance with the intrusion amount of the faster 93 to the pressure plate main body 455. This procedure is referred to as Step 4.

In a state in which the outer circumferential portion 460a of the disc spring 460 is deformed toward the pressure plate main body 455 and the disc spring 460 is elastically deformed, an engaging member 463 is fitted to the inner circumferential portion 442e of the clutch housing 442. This procedure is referred to as Step 5.

And, when the fastener 92 or the fastener 93 is removed, the disc spring 460 reverts from the elastically deformed state. At this time, the disc spring 460 extends in a direction approximately in parallel to the direction in which the surface 64d of the friction plate 64 extends, and the outer circumferential portion 460a is engaged with the engaging member 463. Consequently, the disc spring 460 is placed between the clutch housing 442 and the pressure plate main body 455. This procedure is referred to as Step 6. In the manner mentioned above, the clutch 44 is assembled.

Operation of the Clutch:

Next, the operations of the clutch will be explained. First, the operation for disengaging the clutch 44 will be explained.

When the rider 100 of the motorcycle 1 pulls the clutch lever 24 (see FIG. 1), the clutch release mechanism 86 is activated. Consequently, the long push rod 473 moves to the right. Then, the ball 472 and the short push rod 471 also move to the right, causing the rightward movement of the pressure plate main body 455 against the urging force of the disc spring 460. Consequently, the pressure-contact state of the plate group 66 is released, resulting in disengagement of the clutch 44.

Next, the operation for engaging the clutch 44 will be explained.

To engage the clutch 44, the rider 100 releases the clutch lever 24 that was pulled. This releases the activation of the clutch release mechanism 86, which in turn moves the pressure plate main body 455 to the left by the urging force of the disc spring 460. As a result, the pressure plate main body 455 causes pressure-contact of the plate group 66, resulting in engagement of the clutch 44. At this time, the long push rod 473, the ball 472 and the short push rod 471 also move to the left.

Functions and Effects:

As explained above, the clutch 44 according to this embodiment is equipped with the clutch boss 441, the clutch housing 442, the friction plate 64, the clutch plate 65, and the pressure plate 450. The clutch boss 441 is attached to the main shaft 41 in such a way that it integrally rotates together therewith. The clutch housing 442 encloses the periphery of the clutch boss 441 and is rotatably attached to the main shaft 41. The friction plate 64 has a plate main body 64b having a surface extending to a direction perpendicular to the axial direction of the main shaft 41 and the friction material 64c formed on the surface of the pressure plate 64b. The friction plate 64 is engaged with the clutch housing 442 so as to be rotated therewith.

The clutch plate 65 faces the plate main body 64b via the friction material 64c. The clutch plate 65 is engaged with the clutch boss 441 so as to be rotated together with the clutch boss 441. On the other hand, the pressure plate 450 is engaged with either the clutch boss 441 or the clutch housing 442 which is engaged with the friction plate 64 so as to be rotated therewith. Also, the pressure plate 450 causes pressure-contact of the friction plate 64 and the clutch plate 65 by moving in the axial direction of the main shaft 41.

In a clutch 44 having a friction material 64c, the board thickness of the friction plate 64 becomes uneven due to the difference in thickness of the friction material 64c. In this case, when the pressure plate 450 and the friction plate 64 relatively rotate, in a half clutch state or the like, the pressure plate 450 repeats a contact state and a non-contact state with the friction plate 64 or the clutch plate 65.

However, according to the clutch 44 of this embodiment, the pressure plate 450 and the friction plate 64 are structured so as not to rotate relatively. Therefore, even if there is unevenness in the board thickness of the friction plate 64, the pressure plate 450 will not repeat the contact state and the non-contact state with respect to the friction plate 64 or the clutch plate 65. As a result, in the clutch 44 according to this embodiment, the occurrence of judder can be controlled. Therefore, according to this embodiment, a friction clutch in which judder is less likely to occur can be provided.

In this embodiment, the friction plate 64 engages with the clutch housing 442 and the clutch plate 65 engages with the clutch boss 441. The pressure plate 450 engages with the clutch housing 442 since the friction plate 64 is engaged with the clutch housing 442. Consequently, the clutch 44 according to this embodiment is structured so that the pressure plate 450 and the friction plate 64 do not rotate relatively. Therefore, even if there is unevenness in the board thickness of the friction plate 64 due to the difference in the thickness of the friction material 64c, the pressure plate 450 will not repeat the contact state and the non-contact state with respect to the friction plate 64 or the clutch plate 65. As a result, in the clutch 44 according to this embodiment, the occurrence of judder can be controlled. Therefore, according to this embodiment, a friction clutch in which judder is less likely to occur can be provided.

The pressure plate 450 according to this embodiment is equipped with the pressure plate main body 455 and the disc spring 460. The disc spring 460 is arranged between the clutch housing 442 and the pressure plate main body 455 and urges the pressure plate main body 455 in the direction in which the friction plate 64 and the clutch plate 65 are pressure-contacted. The clutch 44 is equipped with a thrust bearing 60.

At the time of disengaging the clutch 44, the pressure plate main body 455 moves in a direction opposite to the direction in which the friction plate 64 and the clutch are pressure-contacted against the urging force of the disc spring 460. At this time, an opposing force of the disc spring 460 is applied to the clutch housing 442 through the elastic retainer 461. That is, a force is applied to the clutch housing 442 in a direction in which the clutch housing relatively moves in the axial direction of the main shaft 41 with respect to the clutch boss 441. At this time, the direction of the force applied to the clutch housing 442 is rightward in FIG. 3.

However, the clutch 44 according to this embodiment is equipped with a thrust bearing 60. The thrust bearing 60 is placed between the clutch housing 442 and the clutch boss 441, and allows the relative rotation of the clutch housing 442 and the clutch boss 441 while preventing the relative movements in the axial direction of the main shaft 41. Therefore, a smooth relative rotation between the clutch housing 442 and the clutch boss 441 is secured. Furthermore, between the clutch housing 442 and the clutch boss 441, the relative movement in the axial direction of the main shaft 41 is prevented.

The pressure plate 450 according to this embodiment is provided with a pressure plate main body 455 and a disc spring 460. The disc spring 460 is placed between the clutch housing 442 and the pressure plate main body 455, and urges the pressure plate main body 455 in the direction in which the friction plate 64 and the clutch plate 65 are pressure-contacted. Also, the pressure plate main body 455 engages with the clutch housing 442. In this way, the pressure plate main body 455 not only engages with the clutch housing 442 through the disc spring 460, but directly engages with the clutch housing 442. Consequently, the pressure plate 450 rotates with respect to the clutch housing 442 well in response to the rotation of the clutch housing 442. As a result, in the clutch 44 according to this embodiment, the pressure plate 450 and the friction plate 64 rotate together.

The clutch 44 according to this embodiment is equipped with an engaging member 463 which engages with the outer circumferential portion 460a of the disc spring 460. The engaging member 463 is fitted to the inner circumferential portion 442e of the clutch housing 442. Specifically, the engaging member 463 is fitted to the inner circumferential side of the arm 442d formed on the clutch housing 442. The engaging member 463 according to this embodiment is formed by the elastic retainer 461 and the circlip 462.

Also, the pressure plate main body 455 has a jig mounting portion 457 for mounting the jig 91 which causes deformation of the disc spring 460 so that the outer circumferential portion 460a of the disc spring 460 is displaced toward the pressure plate main body 455 side before fitting the engaging member 463 to the inner circumferential portion 442e of the clutch housing 442. Alternatively, the pressure plate main body 455 can have a fastener mounting portion 458 for attaching the fastener 93.

Since the jig mounting portion 457 is formed in the pressure plate main body 455, when assembling the clutch 44, the jig 91 can be attached to the jig mounting portion 457, and the disc spring 460 can be deformed with the jig 91. Or, since the fastener mounting portion 458 is formed in the pressure plate main body 455, when assembling the clutch 44, the fastener 93 can be attached to the fastener mounting portion 458 and the disc spring 460 can be deformed with the fastener 93. At this time, the disc spring 460 is deformed by the outer circumferential portion 460a by being displaced toward the pressure plate main body 455 side. Consequently, the engaging member 463 can be easily fitted to the inner circumferential portion 442e of the housing main body 442c. Therefore, the clutch 44 in which the pressure plate 450 engages with the clutch housing 442 can be easily assembled.

The clutch 44 according to this embodiment is a multi-plate friction clutch. That is, the clutch 44 is equipped with a plurality of friction plates 64 and a plurality of clutch plates 65. Each friction plate 64 and each clutch plate 65 are arranged alternately along the axial direction of the main shaft 41. Like the clutch 44 of this embodiment, in a multi-plate friction clutch, unevenness of the board thickness of the friction plates 64 accumulates, and judder is more likely to occur as compared to a single-plate friction clutch. In the clutch 44 of this embodiment, however, the occurrence of judder is controlled. Therefore, in the clutch 44 according to this embodiment, because it is a multi-plate friction clutch, the effects of the present invention will be exerted more notably.

The pressure plate 450 is arranged so as to face the friction plate 64 in the axial direction of the main shaft 41 in a manner such that the friction plate 64 and the clutch plate 65 are pressure-contacted by pressing the friction plate 64. That is, in the plate group 66 according to this embodiment, the friction plate 64 is disposed at the rightmost side. Therefore, the pressure plate 450 can directly press the friction plate 64 rotating with the pressure plate 450. As a result, the clutch 44 according to this embodiment can more assuredly prevent the repetition of the contact and non-contact state of the pressure plate 450 and the plate group 66.

The clutch 44 according to this embodiment is operated by the rider 100, and is provided with a clutch lever 24 for moving the pressure plate main body 455 to the right against the urging force of the disc spring 460. In a manual friction clutch such as the clutch 44, as compared with an automatic friction clutch that automatically engages/disengages the clutch using an actuator such as a motor, half clutch state is more likely to occur. Therefore, judder is more likely to occur in a manual friction clutch. In the clutch 44 of this embodiment, however, the occurrence of judder is controlled. Therefore, since the clutch 44 of this embodiment is a manual friction clutch, the effects of the present invention will be exerted more notably.

The pressure plate 450 has a contact surface 452s that contacts the friction plate 64 or the clutch plate 65. The contact surface 452s is formed at a position of the pressing portion 452 where it directly contacts the friction plate 64. The contact area of the friction plate 64 or the clutch plate 65 to the pressing portion 452 is smaller than the contact area of the friction plate 64 to the clutch plate 65. The pressure plate 450 can be decreased in size by reducing the contact area of the pressing portion 452 to the friction plate 64 or the clutch plate 65. That is, the clutch 44 of this embodiment can be made compact.

In a vehicle equipped with a friction clutch with no judder occurrence control, when vibrations due to judder occur, the passengers of the vehicle loses comfort during the ride due to the vibrations. On the other hand, in the clutch 44 of this embodiment, the occurrence of judder is controlled. Therefore, in a vehicle equipped with the clutch 44, vibrations due to judder are less likely to occur in the half clutch state. In this embodiment, the vehicle equipped with the clutch 44 is the motorcycle 1. That is, in the motorcycle according to this embodiment, the comfort during the ride for the rider 100 has been improved.

The assembly method for the clutch 44 according to this embodiment includes Step 1, Step 2, Step 3, Step 4, Step 5, and Step 6. Step 1 is a step for preparing the clutch boss 441 attached to the axis of the main shaft 41 so as to be integrally rotated therewith, and a clutch housing 442 rotatably attached to the main shaft 41 and enclosing the periphery of the clutch boss 441.

Step 2 is a step for alternately arranging a plurality of friction plates 64 equipped with a plate main body 64b having a surface 64d extending in a direction perpendicular to the axial direction of the main shaft 41 and a friction material 64c formed on the surface 64d of the plate main body 64b, and a plurality of clutch plates 65 so as to face with each other at intervals therebetween in the axial direction of the main shaft 41 with the friction plate 64 engaged with the clutch housing 442 and with the clutch plate 65 engaged with the clutch boss 441.

Step 3 is a step for arranging the pressure plate 460 equipped with the pressure plate main body 455 and an approximately circular disc spring 460 in which the inner circumferential portion 460b is engaged with a side of the pressure plate main body 455 opposite to the friction plate 64 and the clutch plate 65 in a manner such that the pressure plate 450 approaches the friction plate 64 and the clutch plate 65 along the axial direction of the main shaft 41.

Step 4 is a step for deforming the disc spring 460 in a manner such that the outer circumferential portion 460a of the disc spring 460 is deformed toward the pressure plate main body side 455.

Step 5 is a step for fitting the engaging member 463 to the inner circumferential portion 442e of the clutch housing 442 in a state in which the disc spring 460 is deformed.

Step 6 is a step for bringing the disc spring 460 back into the original state so that the outer circumferential portion 460a of the disc spring 463 is engaged with the engaging member 463 to thereby place the disc spring 460 between the clutch housing 442 and the pressure plate main body 455 via the engaging member 463.

Embodiment 2

In Embodiment 1, the radially outward end portion 451 of the pressure plate main body 455 is fitted to the inner circumferential side of the arm 442d of the clutch housing 442. That is, the pressure plate main body 455 is equipped with the outer end portion 451 to be engaged with the clutch housing 442. Consequently, the pressure plate main body 455 can be engaged with and rotated with the clutch housing 442. However, the pressure plate main body 455 does not need to have the outer end portion 451. That is, the pressure plate main body 455 is not required to be directly engaged with the clutch housing 442.

The pressure plate main body 455 according to this embodiment can be indirectly engaged with the clutch housing 442 so as to be rotated therewith. Hereinafter, the pressure plate 450 according to this embodiment will be explained. In the following explanation, the same reference numerals are allotted to the same structures and Steps as in the aforementioned Embodiment, and the explanation will be omitted.

a. Pressure Plate 450

Figure 7:
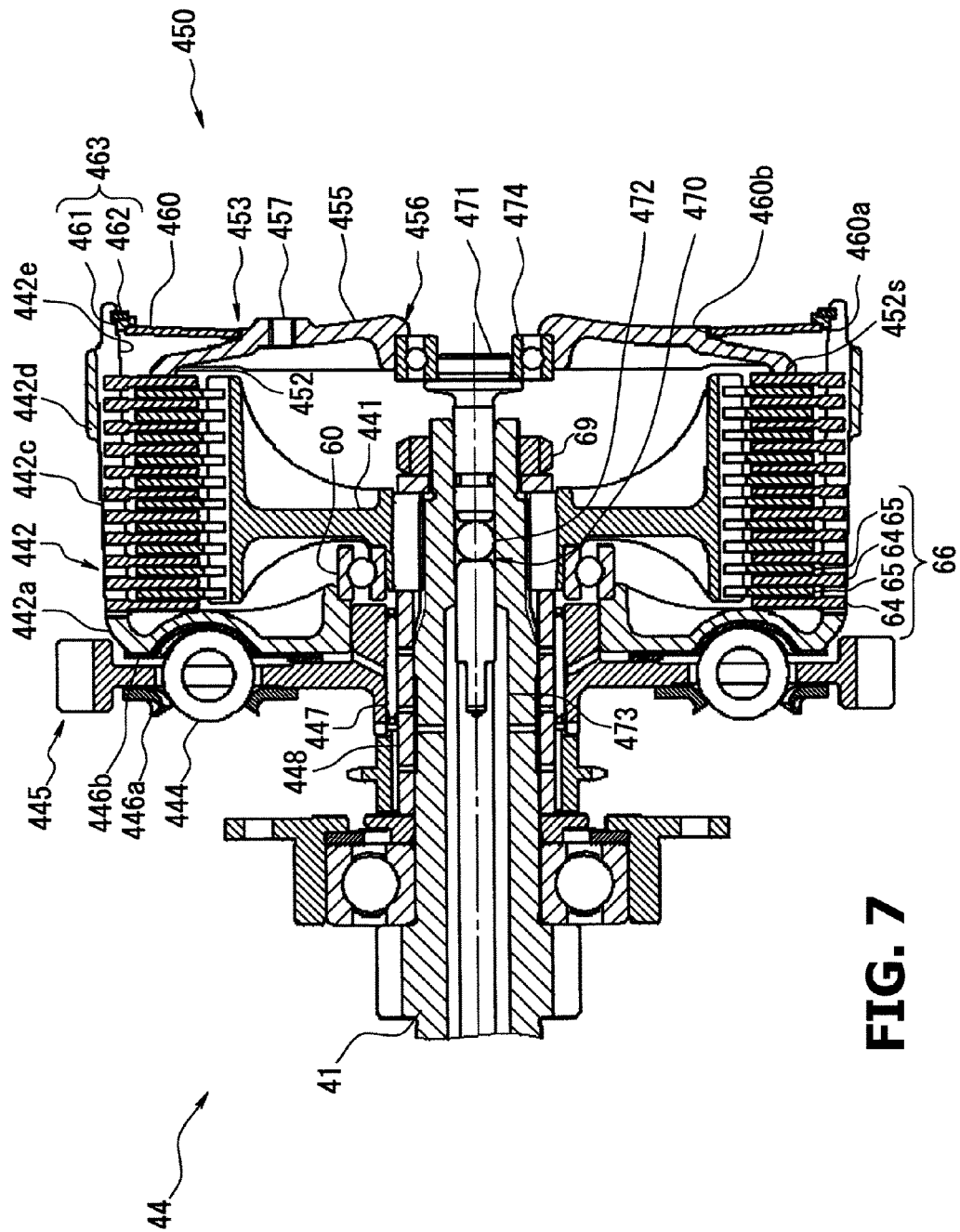
FIG. 7 is a cross-sectional view of the clutch according to Embodiment 1.

As shown in FIG. 7, the pressure plate 450 is disposed on the right side of the main shaft 41. The pressure plate 450 is formed into an approximately disc shape. The pressure plate 450 includes a pressure plate main body 455 and a disc spring 460. The pressure plate 450 is engaged with the clutch housing 442 so as to be rotated therewith in a manner such that the pressure plate 450 cannot be relatively rotated with respect to the friction plate 64. In this embodiment, the friction plate 64 is engaged with the clutch housing 442 so as to be rotated therewith. The pressure plate 450 moves in the axial direction of the main shaft 41 to cause pressure-contact of the friction plate 64 and the clutch plate 65.

The pressure plate 450 according to this embodiment can be engaged with the clutch housing 442 via the disc spring 460. In other words, the pressure plate main body 455 of this embodiment is not directly engaged with the clutch housing 442.

A pressing portion 452 extruding toward the plate group 66 side is formed on the radially outward portion of the pressure plate main body 455. In this embodiment, the pressing portion 452 is formed on the radially outward end portion of the pressure plate main body 455. The pressing portion 452 faces the friction plate 64 positioned on the rightmost side of the plate group 66. When the pressure plate 450 moves to the left, the pressing portion 452 presses the friction plate 64 to the left. As a result, the friction plate 64 and the clutch plate 65 of the plate group 66 are pressure-contacted.

In place of the above, the pressure plate 450 can be disposed so as to face the clutch plate 65 in the axial direction of the main shaft 41. That is, in the plate group 66, the clutch plate 65 can be disposed at the rightmost side of the plate group 66.

b. Disk Spring 460

The disc spring 460 is disposed so that it extends in a direction perpendicular to the axial direction of the main shaft 41, and the outer circumferential portion thereof 460a engages with the elastic retainer 461, and the inner circumferential portion thereof 460b engages with the retainer portion 453. The right side of the elastic retainer 461 is in direct contact with the circlip 462. The elastic retainer 461 and the circlip 462 are fitted to the inner circumferential side of the arm 442d. Therefore, the movements of the elastic retainer 461 and the pressure plate main body 455 to the opposite side (that is, the right side) of the plate group 66 are controlled. Consequently, the disc spring 460 can urge the pressure plate main body 455 toward the plate group 66 side (that is, the left side). As a result, the pressure plate main body 455 engages with the clutch housing 442 via the disc spring 460. Therefore, the pressure plate main body 455 can rotate together with the clutch housing 442 even if it is not fitted to the clutch housing 442 or not directly engaged therewith.

As explained above, the pressure plate main body 455 according to this embodiment is indirectly engaged with the clutch housing 442 via the disc spring 460. Therefore, the pressure plate main body 455 according to this embodiment, as opposed to Embodiment 1, does not have the outer end portion 451 engaged with the inner circumferential portion 442e of the clutch housing 442. That is, it does not require a special engaging portion to engage the pressure plate main body 455 with the clutch housing 442. Therefore, according to this embodiment, the structure of the pressure plate main body 455 can be simplified.

In each of the aforementioned embodiments, the pressure plate 450 is configured such that it rotates with the friction plate 64 engaged with the clutch housing 442. That is, the pressure plate 450 according to each of the aforementioned embodiments is engaged with the clutch housing 442 in such a way that it is not relatively rotatable to the clutch housing 442. However, the pressure plate 450 can have a structure in which it can rotate with the friction plate 64 engaged with the clutch boss 441. In this case, the friction material 64c which retains the frictional force between the friction plate 64 and the clutch plate 65 is formed on the surface of the friction plate 64 engaged with the clutch boss 441.

Hereinafter, the clutch 44 according to this embodiment will be explained. In the following explanation, the same reference numerals are allotted to the same structures and Steps as in the aforementioned Embodiments, and the explanation will be omitted.

c. Clutch Boss 441

Figure 8A:
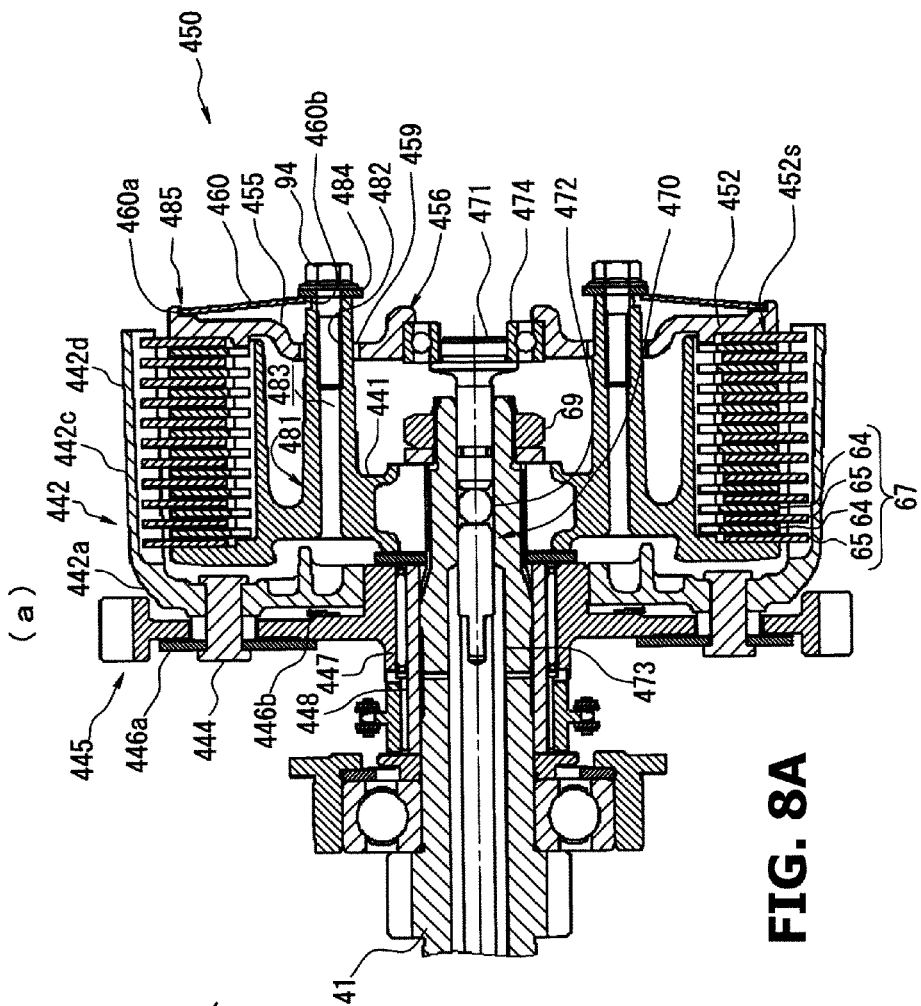
FIG. 8A-8B are cross-sectional views of a clutch according to Embodiment 2.

As shown in FIG. 8A, the clutch boss 441 is attached to the main shaft 41 so as to be integrally rotated together with the main shaft 41. The clutch boss 441 is non-rotatably fixed to the main shaft 41 with a nut 69. That is, the clutch boss 441 rotates together with the main shaft 41. In the clutch boss 441, with respect to the radial direction, portions of the clutch boss 441 located inner than the positions to be engaged with the below-mentioned friction plate 64 are protruded to the right. The protruded portion is referred to as a disc spring supporting portion 481.

The disc spring supporting portion 481 essentially extends parallel to the axial direction of the main shaft 41. The clutch boss 441 has a plurality of disc spring supporting portions 481. The plurality of disc spring supporting portions 481 are formed at approximately the same positions in the radial direction of the clutch boss 441. In other words, when observed the clutch 44 from the direction in which the axial center of the main shaft 41 extends, the plurality of disc spring supporting portions 481 are positioned on approximately the same circumference. The right edge of the disc spring supporting portion 48 is positioned farther to the right than the right edge of the pressure plate main body 455.

d. Clutch Plate 65

As shown in FIG. 8A, a plurality of clutch plates 65 are arranged inside the clutch housing 442. The clutch plate 65 according to this embodiment is approximately annular in shape. The plurality of clutch plates 65 are engaged with the clutch housing 442 so as to be rotated therewith. In this embodiment, each clutch plate 65 is fixed to the clutch housing 442 immovably with respect to the rotational direction of the main shaft 41. Therefore, a plurality of clutch plates 65 rotate together with the clutch housing 442. Each clutch plate 65 is displaceable in the axial direction of the main shaft 41. Therefore, the distance between the adjacent clutch plates 65 can be changed.

e. Friction Plate 64

A plurality of clutch plates 65 are arranged along the axial direction of the main shaft 41. The friction plates 64 are disposed between adjacent clutch plates 65. The friction plate 64 is approximately annular in shape. The friction plate 64 faces the adjacent clutch plate 65.

Figure 8B:
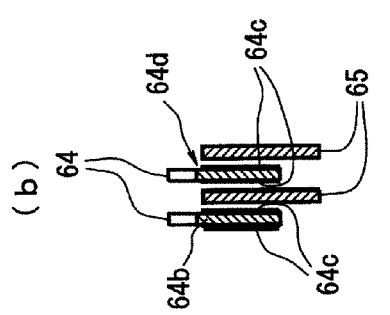

As shown in FIG. 8B, each friction plate 64 has a plate main body 64b and a friction material 64c. The plate main body 64b has a surface 64d. The surface 64d extends in a direction perpendicular to the axial direction of the main shaft 41 (see FIG. 8A). Also, the friction material 64c is formed on the surface 64d of the plate main body 64b. The friction material 64c is adhered to the surface 64d.

The clutch plate 65 faces the plate main body 64b of the friction plate 64 via the friction material 64c. Also, in this embodiment, the friction plate 64 is engaged with the clutch boss 441 so as to be rotated therewith. Each friction plate 64 is fixed to the clutch boss 441 immovably in the rotational direction of the main shaft 41. Therefore, a plurality of friction plates 64 rotates together with the clutch boss 441. Each friction plate 64 is displaceable with respect to the axial direction of the main shaft 41. Consequently, the distance between the adjacent friction plates 64 is changeable.

In this embodiment, a plate group 67 is formed by the plurality of friction plates 64 and the plurality of clutch plates 65.

f. Pressure Plate 450

The pressure plate 450 is disposed on the right side of the main shaft 41. The pressure plate 450 is formed into an approximately disc shape. The pressure plate 450 has the pressure plate main body 455 and the disc spring 460. The pressure plate 450 is engaged with the clutch boss 441 so as to be rotated therewith in a manner such that the pressure plate 450 is non-rotatable with respect to the friction plate 64. As explained above, in this embodiment, the friction plate 64 is engaged with the clutch boss 441 so as to be rotated therewith. The pressure plate 450 causes pressure-contact of the friction plate 64 and the clutch plate 65 by moving in the axial direction of the main shaft 41.

The pressure plate main body 455 and the short push rod 471 are fixed to each other with a bearing 474. The bearing 474 is attached to the right end portion of the short push rod 471 and the center portion 456 of the pressure plate main body 455. The short push rod 471 and the pressure plate main body 455 can both move in the axial direction of the main shaft 41. However, the short push rod 471 and the pressure plate main body 455 relatively rotate in the circumferential direction of the main shaft 41.

An aperture portion 459 is formed at a portion of the pressure plate main body 455 that overlaps with a portion on the disc spring supporting portion 481 in the radial direction. The pressure plate main body 455 has a plurality of aperture portions 459. The number of aperture portions 459 is the same as the number of the disc spring supporting portions 481. Each disc spring supporting portion 481 penetrates each aperture portion 459.

The pressing portion 452 is formed on the radially outer portion of the pressure plate main body 455. The pressing portion 452 faces the rightmost friction plate 64 of the plate group 67. When the pressure plate 450 moves to the left, the pressing portion 452 presses the friction plate 64 to the left. As a result, the friction plate 64 and the clutch plate 65 of the plate group 67 are pressure-contacted.

The pressure plate 450 can be disposed so as to face the clutch plate 65 in the axial direction of the main shaft 41. That is, in the plate group 67, the clutch plate 65 can be disposed on the rightmost side.

g. Disc Spring 460

The disc spring 460 is placed between the clutch housing 442 and the pressure plate main body 455. The disc spring 460 urges the pressure plate main body 455 in the direction that the friction plate 64 and the clutch plate 65 are pressure-contacted. The disc spring 460 is approximately annular in shape.

The disc spring 460 is disposed so as to extend in a direction perpendicular to the axial direction of the main shaft 41 with its outer circumferential portion 460a engaged with a retainer portion 485 and with its inner circumferential portion 460b engaged with a washer member 484. The retainer portion 485 is formed on the surface of the pressure plate main body 455 opposite to the plate group 67. On the other hand, the washer member 484 is attached to the right end of the disc spring supporting portion 481. The disc spring supporting portion 481 has a hollow portion 483 therein. The hollow portion 483 extends along the axial direction of the main shaft 41. A thread 482 is formed on the right end portion of the hollow portion 483. That is, the thread 482 is formed on the inside of the right end portion of the disc spring supporting portion 481 with respect to the radial direction. In the hollow portion 483, a fastener 94 is screwed along the thread 482. The fastener 94 is partly accommodated in the hollow portion 483 via the washer member 484.

When the fastener 94 is screwed into the hollow portion 483, the washer member 484 directly contacts the inner circumferential portion 460b of the disc spring 460. At this time, the outer circumferential portion 460a of the disc spring 460 is engaged with the retainer portion 485 by the urging force of the disc spring 460. The number of fasteners 94 is the same as the number of disc spring supporting portions 481. The fastener 94 is a generally available bolt.

The disc spring 460 urges the pressure plate main body 455 to the left with the retainer portion 485. On the other hand, the disc spring 460 urges the clutch boss 441 to the right via the washer member 484. Consequently, the friction plate 64 and the clutch plate 65 are pressure-contacted. That is, the disc spring 460 urges the pressure plate main body 455 toward the plate group 67 side (that is, the left side). As a result, the pressure plate main body 455 engages with the clutch boss 441 via the disc spring 460. Therefore, the pressure plate main body 455 can rotate together with the clutch boss 441 even if it is not fitted to or not directly engaged with the clutch boss 441.

In this embodiment, the friction plate 64 engages with the clutch boss 441 and the clutch plate 65 engages with the clutch housing 442. The pressure plate 450, because the friction plate 64 is engaged with the clutch boss 441, is engaged with the clutch boss 441. Consequently, the clutch 44 according to this embodiment is structured so that the pressure plate 450 and the friction plate 64 do not relatively rotate. Therefore, even if the board thickness of the friction plate 64 is uneven due to the differences in thickness of the friction material 64c, the pressure plate 450 will not repeat contact and non-contact state with respect to the friction plate 64 or the clutch plate 65. As a result, the occurrence of judder is controlled in the clutch according to this embodiment. Therefore, this embodiment can provide a friction clutch in which judder is less likely to occur.

Industrial Applicabilty

The present invention is applicable to a friction clutch, a vehicle equipped with the same, and an assembly method of the friction clutch.

Broad Scope of the Invention

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A friction clutch, comprising:
   a clutch boss attached to a clutch shaft so as to be integrally rotated therewith;
   a clutch housing attached to the clutch shaft in a rotatable manner so as to surround a periphery of the clutch boss;
   a friction plate including a plate main body having a surface extending in a direction perpendicular to an axial direction of the clutch shaft and a friction material formed on a surface of the plate main body, the friction plate being engaged with one of the clutch boss and the clutch housing so as to be rotated therewith;
   a clutch plate facing the plate main body via the friction material, the clutch plate being engaged with the other of the clutch boss and the clutch housing so as to be rotated therewith; and
   a pressure plate engaged with one of the clutch boss and the clutch housing with which the friction plate engages so as to be rotated therewith in a manner such that the pressure plate is non-rotatable with respect to the friction plate, the pressure plate being configured to move in the axial direction of the clutch shaft to cause pressure-contact of the friction plate and the clutch plate; wherein
   the friction plate is engaged with the clutch housing, wherein the clutch plate is engaged with the boss, and wherein the pressure plate is engaged with the clutch housing.

2. The friction clutch as recited in claim 1,
   wherein the pressure plate is equipped with a pressure plate main body, and a urging member disposed between the clutch housing and the pressure plate main body and configured to urge the pressure plate main body in a direction of causing pressure-contact of the friction plate and the clutch plate, and
   wherein the friction clutch further comprises a bearing disposed between the clutch housing and the clutch boss and configured to allow relative rotation of the clutch housing and the clutch boss while preventing relative movements thereof in the axial direction of the clutch shaft.

3. The friction clutch as recited in claim 1, wherein the pressure plate includes:
   a pressure plate main body to be engaged with the clutch housing; and
   an urging member disposed between the clutch housing and the pressure plate main body and configured to urge the pressure plate main body in a direction of causing pressure-contact of the friction plate and the clutch plate.

4. The friction clutch as recited in claim 1, wherein the pressure plate includes:
   a pressure plate main body which is not engaged with the clutch housing; and
   an urging member disposed between the clutch housing and the pressure plate main body and configured to urge the pressure plate main body in a direction of causing pressure-contact of the friction plate and the clutch plate.

5. The friction clutch as recited in claim 1, wherein the pressure plate comprises:
   a pressure plate main body; and
   an approximately circular disc spring disposed on a side of the pressure plate main body opposite to the friction plate and the clutch plate with respect to the axial direction of the clutch shaft and configured to urge the pressure plate main body in a direction of causing pressure-contact of the friction plate and the clutch plate with an outer peripheral portion of the disc spring engaged with the clutch housing and with an inner peripheral portion of the disc spring engaged with the pressure plate main body so that the disc spring is disposed between the clutch housing and the pressure plate main body, and
   wherein the friction clutch further comprises:
   an engaging member fitted to an inner peripheral portion of the clutch housing and configured to engage the outer peripheral portion of the disc spring,
   wherein the pressure plate main body has a mounting portion for mounting a jig or a fastening member which causes deformation of the disc spring so as to displace the outer peripheral portion of the disc spring toward the pressure plate main body side before fitting the engaging member to the inner peripheral portion of the clutch housing.

6. The friction clutch as recited in claim 1, wherein the friction plate is engaged with the clutch boss, wherein the clutch plate is engaged with the clutch housing, and wherein the pressure plate is engaged with the clutch boss.

7. The friction clutch as recited in claim 1, wherein a plurality of the friction plates and a plurality of the clutch plates are arranged alternately along the axial direction of the clutch shaft.

8. The friction clutch as recited in claim 1, wherein the pressure plate is disposed so as to face the friction plate in the axial direction of the clutch shaft so that the pressure plate presses the friction plate to cause pressure-contact of the friction plate and the clutch plate.

9. The friction clutch as recited in claim 1,
   wherein the pressure plate includes a pressure plate main body and an urging member which urges the pressure plate main body in a direction of causing pressure-contact of the friction plate and the clutch plate, and
   wherein the friction clutch further comprises a clutch operator for moving the pressure plate main body in a direction opposite to the direction of causing pressure-contact of the friction plate and the clutch plate against a urging force of the urging member.

10. The friction clutch as recited in claim 1,
wherein the pressure plate has a contact portion that contacts the friction plate or the clutch plate, and
wherein a contact area of the contact portion is smaller than a contact area of the friction plate contacting the clutch plate.

11. A vehicle equipped with a friction clutch,
wherein the friction clutch comprises:
a clutch boss attached to a clutch shaft so as to be integrally rotated therewith;
a clutch housing attached to the clutch shaft in a rotatable manner so as to surround a periphery of the clutch boss;
a friction plate including a plate main body having a surface extending in a direction perpendicular to an axial direction of the clutch shaft and a friction material formed on a surface of the plate main body, the friction plate being engaged with one of the clutch boss and the clutch housing so as to be rotated therewith;
a clutch plate facing the plate main body via the friction material, the clutch plate being engaged with the other of the clutch boss and the clutch housing so as to be rotated therewith; and
a pressure plate engaged with one of the clutch boss and the clutch housing with which the friction plate engages so as to be rotated therewith in a manner such that the pressure plate is non-rotatable with respect to the friction plate, the pressure plate being configured to move in the axial direction of the clutch shaft to cause pressure-contact of the friction plate and the clutch plate; wherein the friction plate is engaged with the clutch housing, wherein the clutch plate is engaged with the clutch boss, and wherein the pressure plate is engaged with the clutch housing.

12. The vehicle as recited in claim 11, wherein the friction plate is engaged with the clutch boss, wherein the clutch plate is engaged with the clutch housing, and wherein the pressure plate is engaged with the clutch boss.

13. The vehicle as recited in claim 11, wherein a plurality of the friction plates and a plurality of the clutch plates are arranged alternately along the axial direction of the clutch shaft.

14. The vehicle as recited in claim 11, wherein the pressure plate is disposed so as to face the friction plate in the axial direction of the clutch shaft so that the pressure plate presses the friction plate to cause pressure-contact of the friction plate and the clutch plate.

15. The vehicle as recited in claim 11,
wherein the pressure plate includes a pressure plate main body and an urging member which urges the pressure plate main body in a direction of causing pressure-contact of the friction plate and the clutch plate, and
wherein the friction clutch further comprises a clutch operator for moving the pressure plate main body in a direction opposite to the direction of causing pressure-contact of the friction plate and the clutch plate against a urging force of the urging member.

16. The vehicle as recited in claim 11,
wherein the pressure plate has a contact portion that contacts the friction plate or the clutch plate, and
wherein a contact area of the contact portion is smaller than a contact area of the friction plate contacting the clutch plate.

* * * * *